(12) United States Patent
Takato

(10) Patent No.: US 11,150,462 B2
(45) Date of Patent: Oct. 19, 2021

(54) OBJECTIVE OPTICAL SYSTEM

(71) Applicant: OLYMPUS CORPORATION, Hachioji (JP)

(72) Inventor: Hideyasu Takato, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 307 days.

(21) Appl. No.: 16/400,214

(22) Filed: May 1, 2019

(65) Prior Publication Data

US 2019/0258020 A1    Aug. 22, 2019

Related U.S. Application Data

(63) Continuation of application No. PCT/JP2017/039866, filed on Nov. 6, 2017.

(30) Foreign Application Priority Data

Nov. 16, 2016 (JP) .............................. JP2016-222918

(51) Int. Cl.
  *G02B 23/24* (2006.01)
  *G02B 9/12* (2006.01)
  *G02B 13/04* (2006.01)

(52) U.S. Cl.
  CPC ............. *G02B 23/243* (2013.01); *G02B 9/12* (2013.01); *G02B 13/04* (2013.01)

(58) Field of Classification Search
  CPC ......... G02B 23/243; G02B 13/04; G02B 9/12
  USPC ........................................ 359/788, 786, 785
  See application file for complete search history.

(56) References Cited

U.S. PATENT DOCUMENTS

| | | | |
|---|---|---|---|
| 4,312,572 A | 1/1982 | Yamashita et al. |
| 4,764,001 A | 8/1988 | Yokota |
| 6,252,723 B1 | 6/2001 | Nagaoka |
| 6,433,937 B1 | 8/2002 | Konno |
| 8,130,454 B2 | 3/2012 | Noguchi |
| 9,846,295 B2 | 12/2017 | Takato |
| 2015/0085376 A1 | 3/2015 | Katakura |
| 2015/0103418 A1 | 4/2015 | Takato |
| 2017/0038570 A1 | 2/2017 | Takato |
| 2018/0314054 A1 | 11/2018 | Takato |

FOREIGN PATENT DOCUMENTS

| | | |
|---|---|---|
| CN | 106062609 A | 10/2016 |
| JP | 61044283 B2 | 10/1986 |
| JP | 04003851 B1 | 1/1992 |

(Continued)

OTHER PUBLICATIONS

English-language translation of WO 2010/17228.

(Continued)

*Primary Examiner* — Cara E Rakowski
(74) *Attorney, Agent, or Firm* — Holtz, Holtz & Volek PC

(57) ABSTRACT

An objective optical system consists of in order from an object side to an image side, a first group having a positive refractive power, an aperture stop, a second group having negative refractive power, and a third group having a positive refractive power. Focusing is carried out by moving the second group. The objective optical system satisfies the following conditional expression (1').

$$-16.6 < G2f/FL < -11 \qquad (1')$$

where,
G2f denotes a focal length of the second group, and
FL denotes a focal length of the overall objective optical system in a normal observation state.

2 Claims, 11 Drawing Sheets

(56) References Cited

FOREIGN PATENT DOCUMENTS

| JP | H06317744 | A | 11/1994 |
|----|-----------|---|---------|
| JP | H11316339 | A | 11/1999 |
| JP | 2000267002 | A | 9/2000 |
| JP | 3765500 | B2 | 4/2006 |
| JP | 2010032680 | A | 2/2010 |
| JP | 5948530 | B2 | 7/2016 |
| WO | 2010137228 | A1 | 12/2010 |
| WO | 2014132494 | A1 | 9/2014 |
| WO | 2014155821 | A1 | 10/2014 |
| WO | 2016006486 | A1 | 1/2016 |
| WO | 2016084494 | A1 | 6/2016 |
| WO | 2017119188 | A1 | 7/2017 |

OTHER PUBLICATIONS

Chinese Office Action (and English language translation thereof) dated Sep. 28, 2020, issued in counterpart Chinese Patent Application No. 201780069510.6.
International Search Report (ISR) dated Jan. 30, 2018 issued in International Application No. PCT/JP2017/039866.
Japanese Office Action dated Jun. 13, 2018 issued in counterpart Japanese Application No. 2018-515914.
Japanese Office Action dated Oct. 3, 2018 issued in counterpart Japanese Application No. 2018-515914.
Written Opinion dated Jan. 30, 2018 issued in International Application No. PCT/JP2017/039866.
International Preliminary Report on Patentability (IPRP) dated May 21, 2019 (and English translation thereof) issued in International Application No. PCT/JP2017/039866.
Chinese Office Action (and English language translation thereof) dated Mar. 16, 2021 issued in Chinese Application No. 201780069510.6.

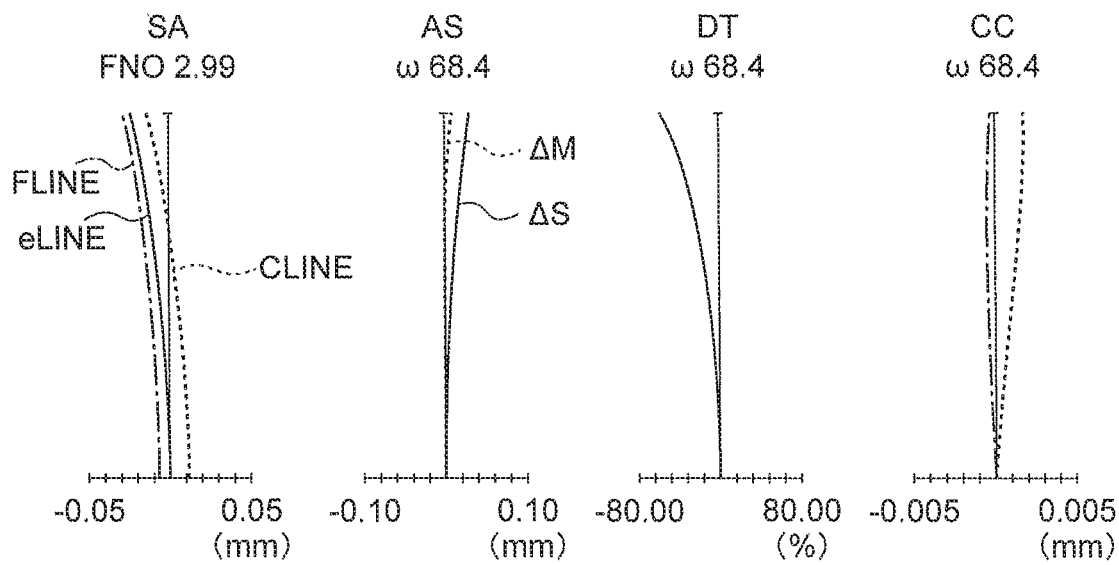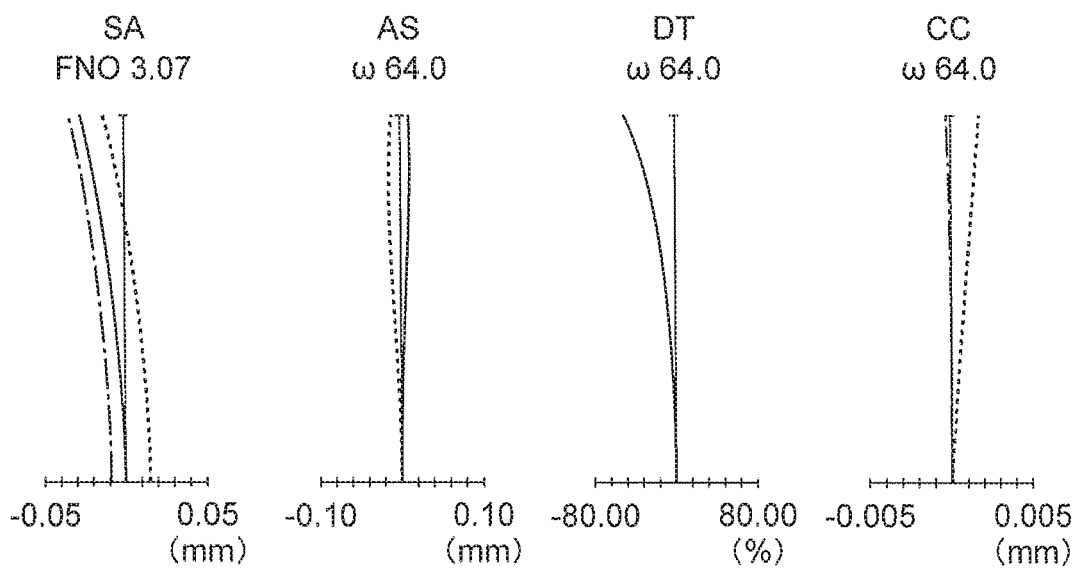

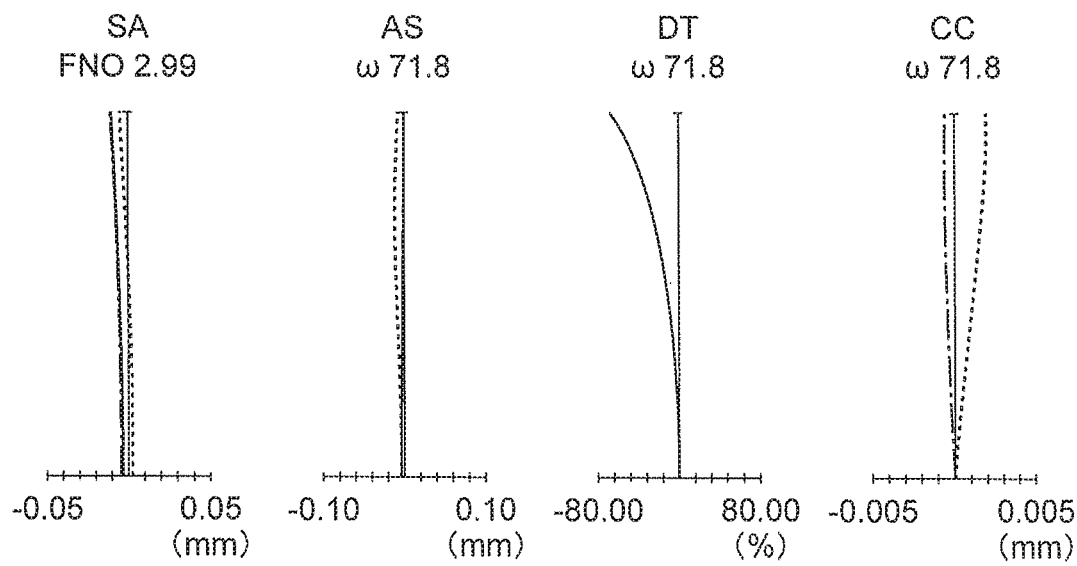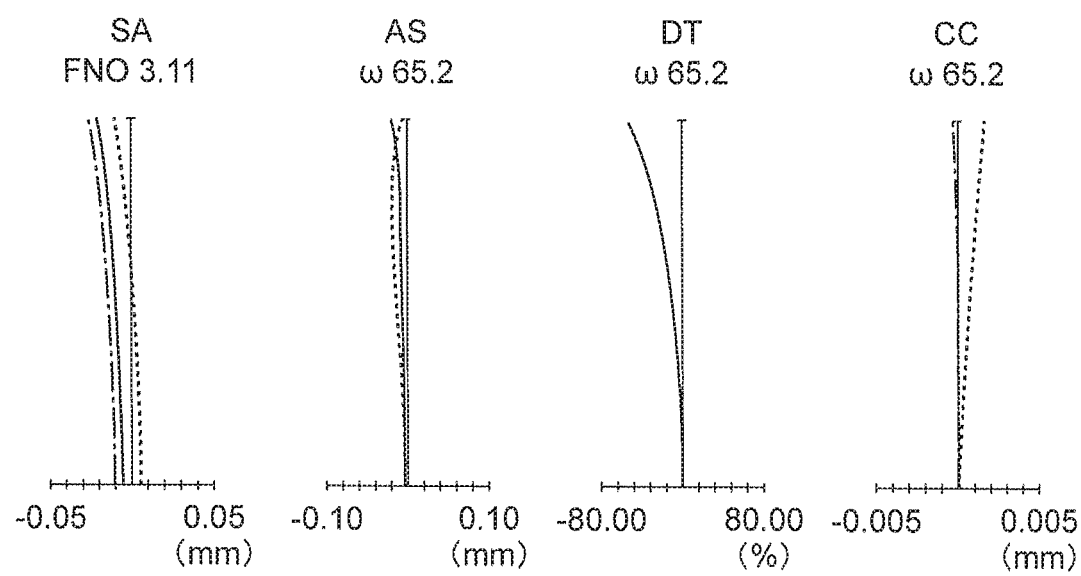

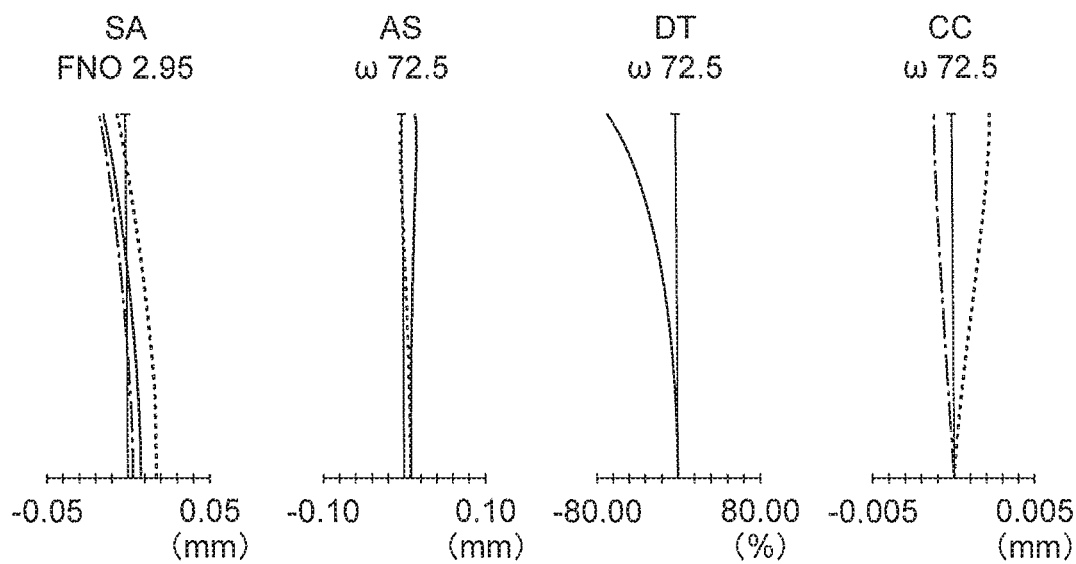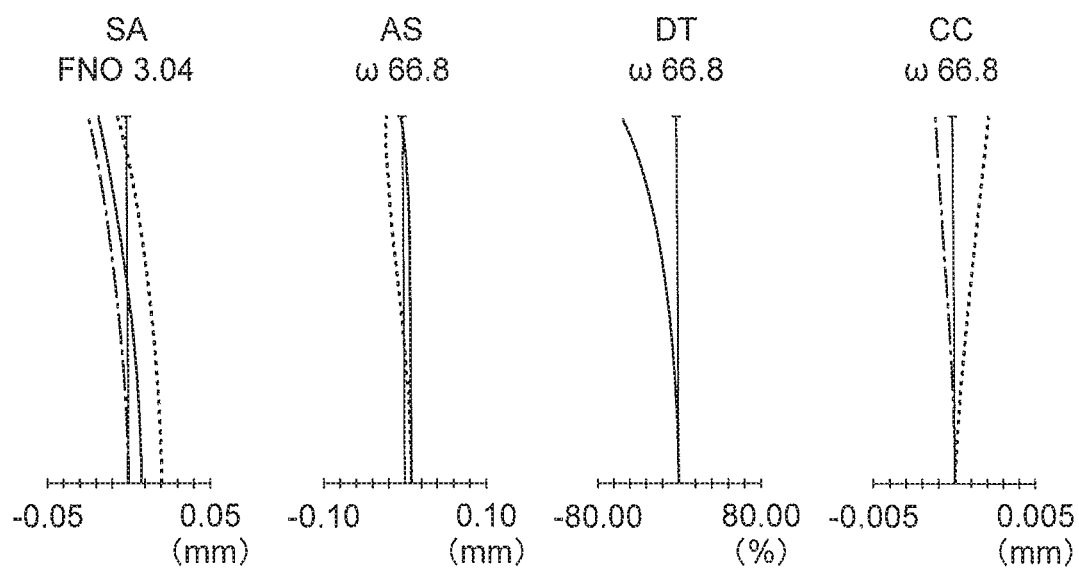

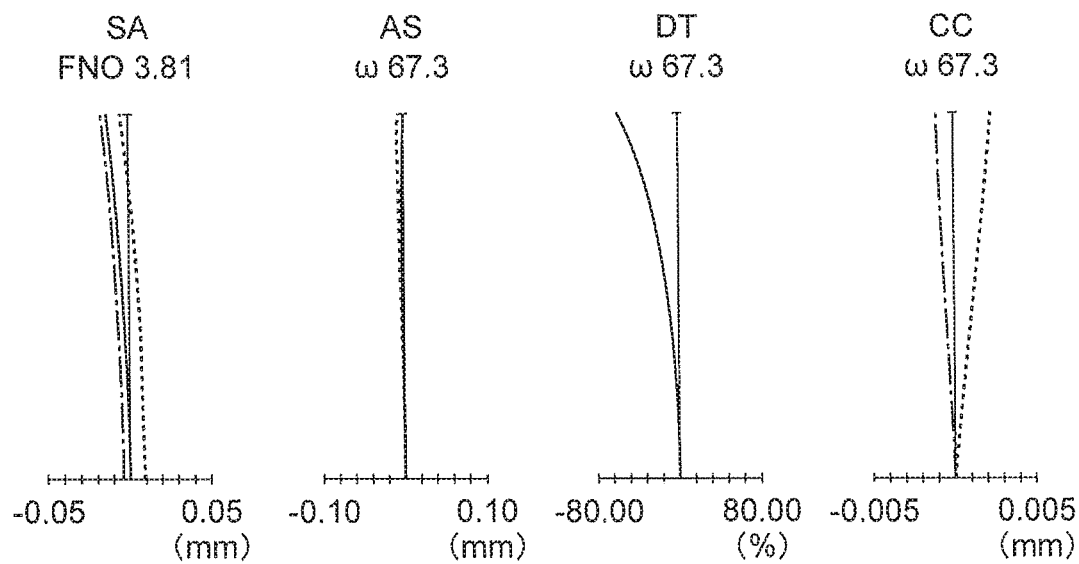
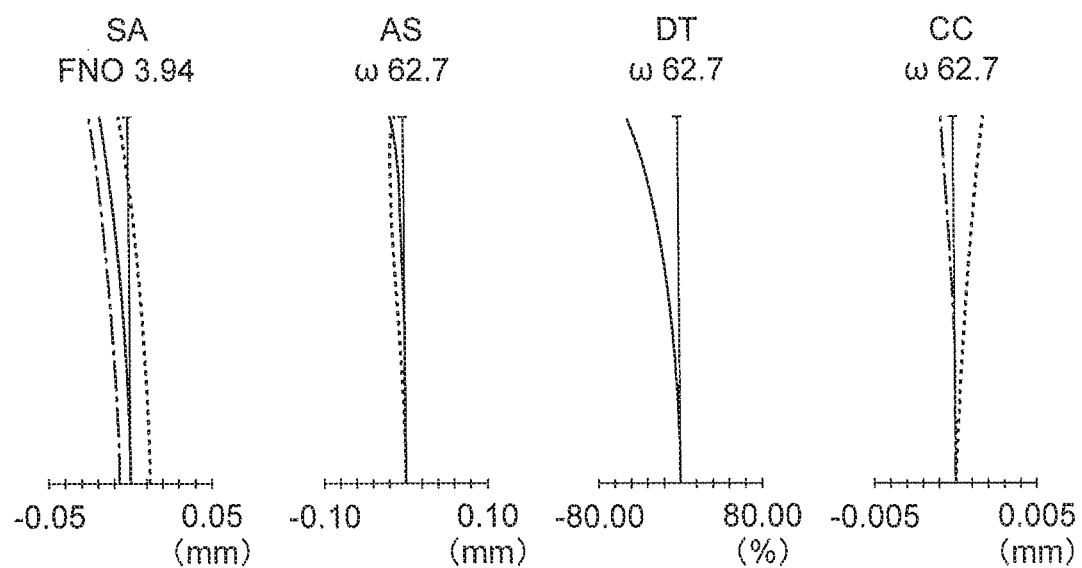

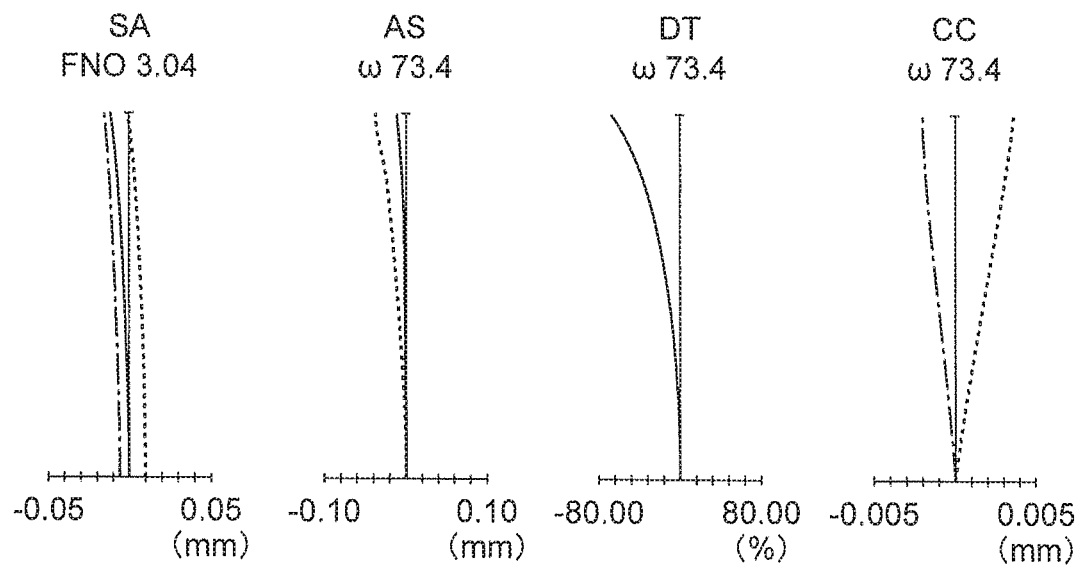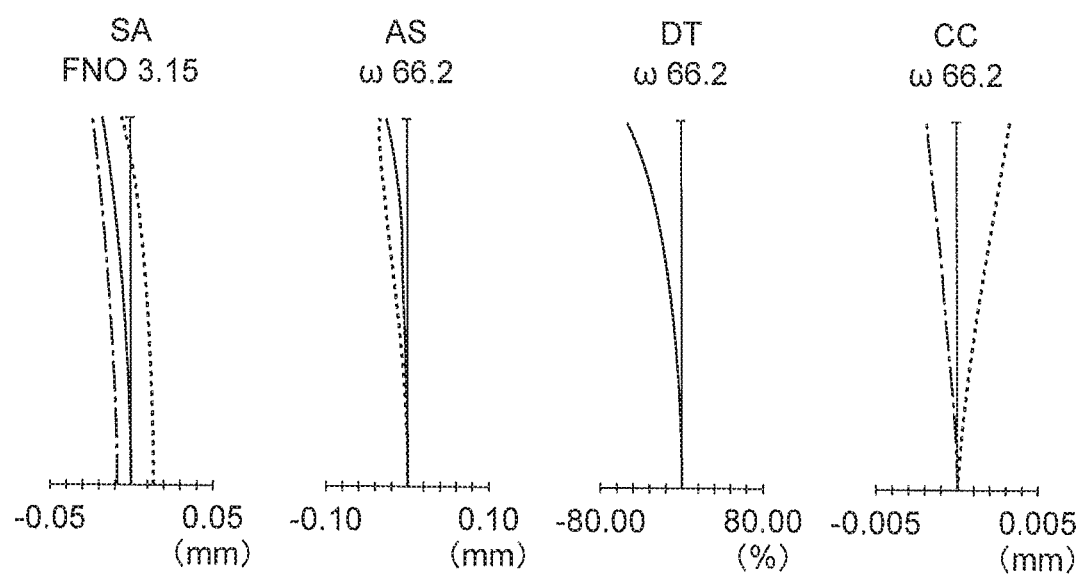

OBJECTIVE OPTICAL SYSTEM

CROSS-REFERENCE TO RELATED APPLICATION

The present application is a continuation application of PCT/JP2017/039866 filed on Nov. 6, 2017 which is based upon and claims the benefit of priority from Japanese Patent Application No. 2016-222918 filed on Nov. 16, 2016; the entire contents of which are incorporated herein by reference.

BACKGROUND OF THE INVENTION

Field of the Invention

The present invention relates to an objective optical system which has a focusing function, and particularly to an objective optical system for endoscope which enables a close observation, and other objective optical system for photography which is suitable for small household cameras.

Description of the Related Art

A commonly-used objective optical system for endoscope has a depth of field in a range of approximately 5 mm to 100 mm on an object side. An endoscope having such objective optical system installed acquires an image by using mainly a CCD (charge coupled device) and a CMOS (complementary metal oxide semiconductor) as a solid image pickup element.

In recent years, for improving an accuracy of diagnosis, achieving a high image quality of an endoscope image has been sought. For this, making the number of pixels of image pickup element large has been progressing. In a case in which an image pickup element having a large number of pixels is used, for avoiding degradation of image quality due to diffraction of light, it is necessary to make an F-number of an objective optical system small. Moreover, in a case in which an image pickup element having a large number of pixels is used, as the image pickup element becomes large due to an effect of an increase in the number of pixels, it is necessary to make also a focal length of the objective optical system large.

Therefore, in an objective optical system of endoscope in which an image pickup element having a large number of pixels is used, the depth of field becomes narrow. Accordingly, in order to secure the depth of field of the same level heretofore, the necessity of an objective optical system having a focusing function has been increasing.

Japanese Patent Publication after Examination No. Sho 61-044283, Japanese Patent Application Laid-open Publication No. Hei 06-317744, and Japanese Patent Application Laid-open Publication No. Hei 11-316339 disclose objective optical systems for magnifying endoscope which enable focusing to an object point at a close distance. These objective optical systems include three groups having a positive refractive power, a negative refractive power, and a positive refractive power. Japanese Patent Application Laid-open Publication number 2000-267002 discloses an objective optical system for magnifying endoscope which includes three groups having a negative refractive power, a positive refractive power, and a negative refractive power. Japanese Patent Publication No. 3765500 discloses an objective optical system for endoscope with a variable focal length, which includes two groups having a negative refractive power and a positive refractive power. Japanese Patent Publication after Examination No. Hei 04-3851 discloses an objective optical system for endoscope with an adjustable focus, which includes at least three groups having a negative refractive power, a positive refractive power, and a positive refractive power.

Moreover, Japanese Patent Application Laid-open Publication No. 2000-267002, Japanese Patent Publication no. 3765500, and Japanese Patent Publication after Examination No. Hei 04-3851 disclose objective optical systems in which a field lens having a refractive power is disposed nearest to image plane in the objective optical system. Moreover, Japanese Patent Application Laid-open Publication No. 2010-032680 and Japanese Patent Publication no. 5948530 disclose objective optical systems for magnifying endoscope which enable focusing to an object point at a close distance. These objective optical systems include three groups having a positive refractive power, a negative refractive power, and a positive refractive power.

SUMMARY OF THE INVENTION

An objective optical system according to an embodiment of the present invention consists of in order from an object side to an image side,
a first group having a positive refractive power,
an aperture stop,
a second group having a negative refractive power, and
a third group having a positive refractive power, wherein
focusing is carried out by moving the second group, and
the objective optical system satisfies the following conditional expression (1').

$$-16.6 < G2f/FL < -11 \qquad (1')$$

where,
$G2f$ denotes a focal length of the second group, and
FL denotes a focal length of the overall objective optical system in a normal observation state.

BRIEF DESCRIPTION OF THE DRAWINGS

FIG. 3A, FIG. 3B, FIG. 3C, and FIG. 3D show a spherical aberration (SA), an astigmatism (AS), a distortion (DT), and a chromatic aberration of magnification (CC) respectively, in the normal observation state of the example 1, and FIG. 3E, FIG. 3F, FIG. 3G, and FIG. 3H show a spherical aberration (SA), an astigmatism (AS), a distortion (DT), and a chromatic aberration of magnification (CC) respectively, in the close observation state of the example 1;

FIG. 5A, FIG. 5B, FIG. 5C, and FIG. 5D show a spherical aberration (SA), an astigmatism (AS), a distortion (DT), and a chromatic aberration of magnification (CC) respectively, in the normal observation state of the example 2, and FIG. 5E, FIG. 5F, FIG. 5G, and FIG. 5H show a spherical aberration (SA), an astigmatism (AS), a distortion (DT), and a chromatic aberration of magnification (CC) respectively, in the close observation state of the example 2;

FIG. 7A, FIG. 7B, FIG. 7C, and FIG. 7D show a spherical aberration (SA), an astigmatism (AS), a distortion (DT), and a chromatic aberration of magnification (CC) respectively, in the normal observation state of the example 3, and FIG. 7E, FIG. 7F, FIG. 7G, and FIG. 7H show a spherical aberration (SA), an astigmatism (AS), a distortion (DT), and a chromatic aberration of magnification (CC) respectively, in the close observation state of the example 3;

FIG. 9A, FIG. 9B, FIG. 9C, and FIG. 9D show a spherical aberration (SA), an astigmatism (AS), a distortion (DT), and a chromatic aberration of magnification (CC) respectively, in the normal observation state of the example 4, and FIG. 9E, FIG. 9F, FIG. 9G, and FIG. 9H show a spherical aberration (SA), an astigmatism (AS), a distortion (DT), and a chromatic aberration of magnification (CC) respectively, in the close observation state of the example 4;

FIG. 11A, FIG. 11B, FIG. 11C, and FIG. 11D show a spherical aberration (SA), an astigmatism (AS), a distortion (DT), and a chromatic aberration of magnification (CC) respectively, in the normal observation state of the example 5, and FIG. 11E, FIG. 11F, FIG. 11G, and FIG. 11H show a spherical aberration (SA), an astigmatism (AS), a distortion (DT), and a chromatic aberration of magnification (CC) respectively, in the close observation state of the example 5.

DETAILED DESCRIPTION OF THE INVENTION

Objective optical systems according to embodiments of the present invention will be described below in detail by referring to the accompanying diagrams. However, the present invention is not restricted to the embodiments described below.

Figure 1A:
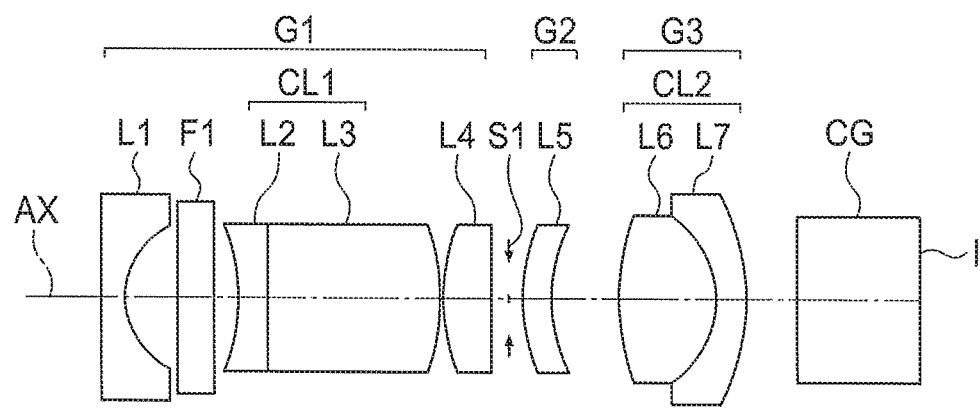
FIG. 1A is a lens cross-sectional view of an objective optical system according to a first embodiment of the present invention.
Figure 1B:
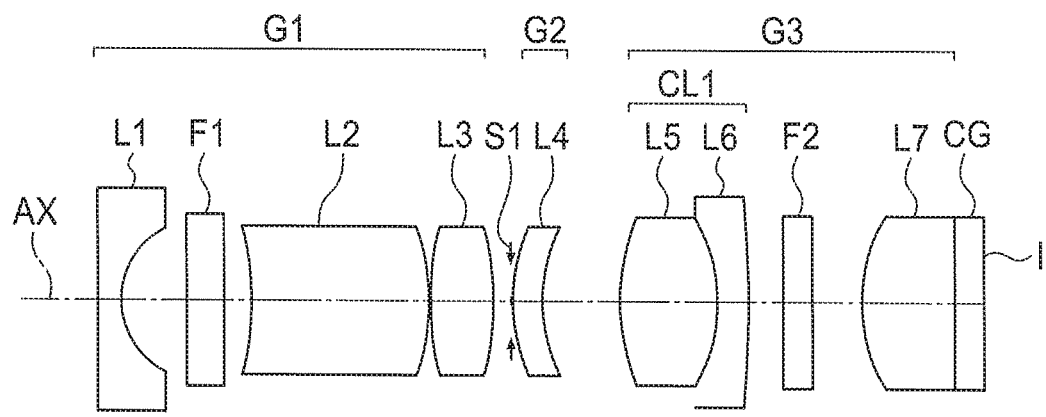
FIG. 1B is a lens cross-sectional view of an objective optical system according to a second embodiment of the present invention.

Lens cross-sectional views of each embodiment will be described below. FIG. 1A and FIG. 1B are lens cross-sectional views of an objective optical system according to a first embodiment and an objective optical system according to a second embodiment respectively.

First Embodiment

FIG. 1A is a lens cross-sectional view of the objective optical system according to the first embodiment. The objective optical system of the first embodiment includes in order from an object side a first group G1 having a positive refractive power, an aperture stop S1, a second group G2 having a negative refractive power, and a third group G3 having a positive refractive power.

More specifically, as shown in FIG. 1A, the first group G1 having a positive refractive power includes in order from the object side, a first lens L1 having a negative refractive power of which a concave surface is directed toward an image side, a second lens L2 having a negative refractive power, a third lens L3 having a positive refractive power, and a fourth lens L4 having a positive refractive power. The second group G2 having a negative refractive power includes a fifth lens L5 having a negative refractive power. Focusing is carried out by moving the second group G2 along an optical axis AX. The third group G3 having a positive refractive power includes in order from the object side, a sixth lens L6 having a positive refractive power, and a seventh lens L7 having a negative refractive power. The second lens L2 having a negative refractive power and a third lens L3 having a positive refractive power are cemented to form a cemented lens CL1. The sixth lens L6 having a positive refractive power and seventh lens L7 having a negative refractive power are cemented to form a cemented lens CL2.

The aperture stop S1 is disposed between the first group G1 and the second group G2. Moreover, a plane parallel plate F1 is disposed between the first lens L1 having a negative refractive power and the second lens L2 having a positive refractive power. It is possible to dispose the plane parallel plate F1 at an arbitrary position in the objective optical system. A cover glass CG is cemented on an image pickup surface I of an image pickup element which is not shown in the diagram.

Second Embodiment

FIG. 1B is a diagram showing a cross-sectional view of a lens arrangement of the objective optical system according to the second embodiment of the present invention. The objective optical system of the present embodiment includes in order from an object side, a first group G1 having a positive refractive power, an aperture stop S1, a second group G2 having a negative refractive power, and a third group G3 having a positive refractive power.

More specifically, as shown in FIG. 1B, the first group G1 having a positive refractive power includes in order from the object side, a first lens L1 having a negative refractive power, a plane parallel plate F1, a second lens L2 having a positive refractive power, and a third lens L3 having a positive refractive power. The second group G2 includes a fourth lens L4 having a negative refractive power. Focusing is carried out by moving the second group G2 along an optical axis AX. The third group G3 having a positive refractive power includes in order from the object side, a fifth lens L5 having a positive refractive power, a sixth lens L6 having a negative refractive power, a plane parallel plate F2, and a seventh lens L7 having a positive refractive power.

The fifth lens L5 having a positive refractive power and the sixth lens L6 having a negative refractive power are cemented to form a cemented lens CL1.

A lens nearest to image is the seventh lens L7 which is a planoconvex lens having a positive refractive power of which a convex surface is directed toward the object side. A cover glass CG which is formed on an image pickup surface I of an image pickup element which is not shown in the diagram is cemented to a flat surface of the seventh lens L7 which is a planoconvex lens having a positive refractive power.

Moreover, the aperture stop S1 is disposed between the first group G1 and the second group G2.

It is possible to dispose the plane parallel plates F1 and F2 at arbitrary positions in the objective optical system.

Moreover, in the first embodiment and the second embodiment, it is desirable to satisfy the following conditional expression (1).

$$-18 < G2f/FL < -11 \tag{1}$$

where,

G2f denotes a focal length of the second group G2, and

FL denotes a focal length of the overall objective optical system in a normal observation state.

Conditional expression (1) is related to an appropriate ratio of G2f and FL. By satisfying conditional expression (1), it is possible to lower an error sensitivity at the time of focusing, and to suppress an aberration fluctuation.

When a value falls below a lower limit value of conditional expression (1), since the refractive power of the second group G2 becomes weak, a capability of correcting a curvature of field is degraded, and a fluctuation in the curvature of field due to focusing becomes large. Accordingly, since there is a remarkable difference in an image-plane position in the normal observation state and an image-plane position in a close observation state, it is not preferable.

Furthermore, when the value falls below the lower limit value of conditional expression (1), an overall length of the optical system becomes long due to an amount of movement of the second group G2 becoming large, thereby making the size large, and therefore it is not preferable.

When an upper limit value of conditional expression (1) is exceeded, since the refractive power of the second group G2 becomes strong, the error sensitivity of the second group G2 on the image plane becomes high. Consequently, a shift in a focusing position on an image pickup surface becomes large due to a shift in a position of the second group G2, and therefore it is not preferable.

Moreover, at the time of movement for focusing, degradation of an optical performance due to tilting and decentering of the second group G2 becomes remarkable. Consequently, a peripheral optical performance is degraded remarkably. Furthermore, in general, the error sensitivity differs in the normal observation state and the close observation state, and there is a difference in the optical performance. Also, when the upper limit value of conditional expression (1) is exceeded, a difference in the optical performance in the normal observation state and the optical performance in the close observation state which arises due to decentering of the second group G2 becomes unignorable.

Furthermore, for making the overall length small, it is desirable to satisfy the following conditional expression (1') instead of conditional expression (1).

$$-16.6 < G2f/FL < -11 \tag{1'}$$

By making an arrangement such that a value does not fall below a lower limit value of conditional expression (1'), it is possible to realize further small-sizing.

Moreover, according to a preferable aspect of the present embodiment, it is desirable to satisfy the following conditional expression (2).

$$0.75 < G3f/G1f < 1.47 \tag{2}$$

where,

G3f denotes a focal length of the third group, and

G1f denotes a focal length of the first group.

Conditional expression (2) is related to an appropriate ratio of G3f and G1f. When a value falls below a lower limit value of conditional expression (2), it is hard to secure a back focus due to the refractive power of the third group becoming excessively strong, and it becomes difficult to secure adequately an amount of adjustment of the focusing position.

When an upper limit value of conditional expression (2) is exceeded, the total length of the optical system becomes long, thereby making it large-size, and therefore it is not preferable.

According to a preferable aspect of the present embodiment, it is desirable to satisfy the following conditional expression (3).

$$1.23 < H1/FL < 1.45 \tag{3}$$

where,

H1 denotes the maximum height of a principal light ray at an object-side surface of the first lens L1, and FL denotes the focal length of the overall objective optical system in the normal observation state.

Conditional expression (3) is related to an appropriate ratio of H1 and FL. When a value falls below a lower limit value of conditional expression (3), a light ray height with respect to a surface of incidence of the first lens L1 being excessively suppressed to be low, it becomes hard to realize a widening of an angle, thereby making it inappropriate as an objective optical system for endoscope.

When an upper limit value of conditional expression (3) is exceeded, a height of a light ray incident on the first lens L1 becomes high, and since a diameter of the first lens L1 becomes large, it leads to making a diameter of a front end of endoscope large size, and therefore it is not preferable.

Moreover, according to a preferable aspect of the present embodiment, it is desirable to satisfy the following conditional expression (4).

$$-1.7 < f1/FL < -1.4 \tag{4}$$

where, f1 denotes a focal length of the first lens L1, and

FL denotes the focal length of the overall objective optical system in the normal observation state.

Conditional expression (4) is related to an appropriate ratio of f1 and FL. Conditional expression (4) is related to a reduction of the error sensitivity for an angle of view. Although an error in an air space between the first lens L1 and the second lens L2 contributes largely to a fluctuation in an angle of field, by the focal length of the first lens L1 being in a range of satisfying conditional expression (4), the objective optical system is strong against a manufacturing error.

When a value falls below a lower limit value of conditional expression (4), the refractive power of the first lens L1 becomes weak, and a manufacturing error sensitivity is lowered. However, in a case in which an attempt is made such that the angle of field becomes an appropriate value by varying the air space between the first lens L1 and the second lens L2, the amount of adjustment becomes excessively large, thereby contributing to making the total length long, and therefore it is not preferable.

When an upper limit value of conditional expression (4) is exceeded, the refractive power of the first lens L1 becomes excessively strong, and the manufacturing error with respect to the angle of field is susceptible to occur.

Moreover, in a case in which an adjustment of the angle of field is carried out, an effect of the fluctuation due to an error after the adjustment becomes large, and therefore it is not preferable.

Moreover, according to a preferable aspect of the present embodiment, it is desirable to satisfy the following conditional expression (5).

$$0.35 < d2G/FL < 0.75 \quad (5)$$

where, d2G denotes an amount of movement of the second group G2, and

FL denotes the focal length of the overall objective optical system in the normal observation state.

Conditional expression (5) is related to an appropriate ratio of d2G and FL. Moreover, conditional expression (5) regulates a condition for lowering a sensitivity of the manufacturing error of an image plane position of the objective optical system.

When a value falls below a lower limit value of conditional expression (5), an image plane sensitivity due to a position accuracy of the second group G2 which is a movable group becomes high. Consequently, a trouble of a shift in the focusing position with respect to the shift in position of the second group G2 due to the manufacturing error is susceptible to occur, and therefore it is not preferable.

When an upper limit value of conditional expression (5) is exceeded, since the amount of movement of the second group G2 becomes large, there arises a need of making the total length of the objective optical system long for securing a space for the movement, and therefore it is not preferable.

It is desirable to satisfy the following conditional expression (5') instead of conditional expression (5).

$$0.4 < d2G/FL < 0.65 \quad (5')$$

By satisfying conditional expression (5'), an effect of conditional expression (5) becomes even larger. An effect of lowering further the sensitivity of the manufacturing error of the second group G2 becomes large. Particularly, in a wide angle optical system, when the error sensitivity is high, a visual-field vignetting is susceptible to occur, and becomes a factor for degrading remarkably a level of an image quality. Furthermore, since a coma due to decentering becomes large, an image degradation in a peripheral portion of the image field occurs, and therefore it is not preferable.

In the first embodiment, the second group G2 includes the fifth lens L5 having a negative refractive power. The fifth lens L5 having a negative refractive power is a negative meniscus lens having a convex surface directed toward the object side. Moreover, in the second embodiment, the second group G2 includes the fourth lens L4 having a negative refractive power. The fourth lens L4 having a negative refractive power is a negative meniscus lens having a convex surface directed toward the object side.

At the time of focusing with a fluctuation in a position of an object point, from the normal observation state to the close observation state, it is necessary to carry out the focusing by moving at least one group. As a lens group to be moved for focusing, any lens group among of the plurality of lens groups in the objective optical system may be moved.

Moreover, the lens group to be moved may be one lens group or may be a plurality of lens groups. Here, in a case in which the lens group to be moved is only one lens group, an effect that a mechanical structure of the objective optical system can be simplified is exerted.

As mentioned above, in the objective optical system of the first embodiment and the objective optical system of the second embodiment, the focusing is carried out by moving the second group G2. At the time of focusing, the fifth lens L5 having a negative refractive power of the first embodiment and the fourth lens L4 having a negative refractive power of the second embodiment are moved along the optical axis AX.

Moreover, for focusing, a method of moving the overall objective optical system or an image pickup element is also possible. However, in this method, a weight of the lens group to be moved or a weight of the image pickup element becomes heavy. Consequently, a load on a drive mechanism becomes heavy, or the mechanism is required to be made large, and therefore it is not preferable.

Moreover, according to a preferable aspect of the present embodiment, it is desirable to satisfy the following conditional expression (6).

$$-8 < G2f/G1f < -2 \quad (6)$$

where,

G2f denotes a focal length of the second group G2, and

G1f denotes the focal length of the first group G1.

Conditional expression (6) is related to an appropriate ratio of G2f and G1f. Moreover, conditional expression (6) regulates a condition for suppressing a fluctuation in the curvature of field at the time of focusing and for contributing to small-sizing, by making appropriate the refractive power of the second group G2.

When a value falls below a lower limit value of conditional expression (6), since the refractive power of the second group G2 becomes weak, the amount of movement of the second group G2 becomes excessively large, and leads to making the overall optical system large-size.

When an upper limit value of conditional expression (6) is exceeded, the fluctuation in the curvature of field due to focusing becomes large, thereby giving rise to a remarkable difference in the image plane position in the normal observation state and the image plane position in the close observation state, and therefore it is not preferable.

Moreover, according to a preferable aspect of the present invention, it is desirable to satisfy the following conditional expression (7).

$$-7 < G2f/G3f < -1.8 \quad (7)$$

where,

G2f denotes the focal length of the second group G2, and

G3f denotes a focal length of the third group G3.

Conditional expression (7) is related to an appropriate ratio of G2f and G3f. Moreover, conditional expression (7) regulates a condition for correcting the curvature of field appropriately.

When a value falls below a lower limit value of conditional expression (7), the image plane is inclined toward an over-side, and when an upper limit value of conditional expression (7) is exceeded, the image plane is inclined toward an under-side. Accordingly, an image is such that a central portion of image field and a peripheral portion of image field are not focused, and therefore it is not preferable.

Moreover, according to a preferable aspect of the present embodiment, it is desirable to satisfy the following conditional expression (8).

$$1.1 < r2/FL < 1.45 \quad (8)$$

where, r2 denotes a radius of curvature of an image-side surface of the first lens L1, and FL denotes the focal length of the overall objective optical system in the normal observation state.

Conditional expression (8) is related to an appropriate ratio of r2 and FL, and regulates a condition related to correction of an astigmatism and correction of a distortion. An endoscope image helps to secure a field of view by making the distortion large essentially.

When a value falls below a lower limit value of conditional expression (8), since the distortion becomes excessively large, the angle of view becomes larger than necessary. As a result, an image is collapsed in the peripheral portion, and therefore it is not preferable. Furthermore, Petzval image plane is inclined largely toward the plus side, and the curvature of field becomes large.

When an upper limit value of conditional expression (8) is exceeded, the Petzval image plane is inclined largely toward the under-side, and the astigmatism becomes large, and therefore it is not preferable.

Moreover, according to a preferable aspect of the present embodiment, it is desirable to satisfy the following conditional expression (9).

$$1.3 < G2fr/G2rr < 1.8 \quad (9)$$

where,

G2fr denotes a radius of curvature of an object-side surface of a lens in the second group G2, and G2rr denotes a radius of curvature of an image-side surface of a lens in the second group G2.

Conditional expression (9) is related to an appropriate ratio of G2fr and G2rr. Moreover, conditional expression (9) is a conditional expression indicating a relationship of the radius of curvature of the object-side surface of the lens in the second group G2 and the radius of curvature of the image-side surface of the lens in the second group G2.

When a value falls below a lower limit value of conditional expression (9), the refractive power of the second group G2 becomes weak. Consequently, for focusing to the image plane, the amount of movement of the second group G2 increases, and the mechanism becomes large in size and complicated, and therefore it is not preferable. Moreover, since an accuracy of decentering due to the manufacturing error of a lens as a single body is not favorable, it contributes to a decentration-aberration image with a peripheral lens performance at the time of assembling, and therefore it is not preferable.

When an upper limit value of conditional expression (9) is exceeded, the refractive power of the second group G2 tends to be strong, and the sensitivity becomes high at the time of focusing to the image plane, and therefore it is not preferable.

The first group G1 of the objective optical system according to the first embodiment includes in order from the object side, the first lens L1 having a negative refractive power of which the concave surface is directed toward the image side, a plane parallel plate F1, the cemented lens CL1 in which the second lens L2 having a negative refractive power and of which the concave surface is directed toward the object side and the third lens L3 having a positive refractive power and of which the convex surface is directed toward the image side are cemented, and the fourth lens L4 having a positive refractive power.

In a bright optical system with a small Fno, such as the objective optical system of the present embodiment, correction of the chromatic aberration may become significant. In such case, it is desirable to dispose the cemented lens CL1 in the first group G1. The cemented lens may be a combination of a meniscus lens having a negative refractive power of which a concave surface is directed toward the object side and a lens having a positive refractive power, and by making such arrangement, it is possible to correct a chromatic aberration of magnification and a longitudinal chromatic aberration favorably.

At this time, in the first embodiment, it is desirable to satisfy the following conditional expression (10).

$$-3.0 < C1F/C1R < -1.0 \quad (10)$$

where,

C1F denotes a focal length of the second lens L2 having a negative refractive power in the cemented lens CL1 in the first group G1, and C1R denotes a focal length of the third lens L3 having a positive refractive power in the cemented lens CL1 in the first group G1.

Conditional expression (10) is related to an appropriate ratio of C1F and C1R. When a value falls below a lower limit value of conditional expression (10), correction of the chromatic aberration of magnification becomes difficult, and therefore it is not preferable. Furthermore, Petzval's sum becomes large, and correction of the curvature of field becomes difficult.

When an upper limit value of conditional expression (10) is exceeded, correction of the longitudinal chromatic aberration becomes difficult, and therefore it is not preferable.

Furthermore, for correcting the chromatic aberration favorably, it is desirable to satisfy conditional expression (10') instead of conditional expression (10).

$$-2.4 < C1F/C1R < -1.0 \quad (10')$$

Within a range of satisfying conditional expression (10'), it is possible to correct the chromatic aberration of magnification more favorably.

Moreover, in the second embodiment shown in FIG. 1B, the lens disposed nearest to image is the lens L7 which is a planoconvex lens having a positive refractive power of which the convex surface is directed toward the object side. The lens L7 which is a planoconvex lens having a positive refractive power is either stuck directly to an image pickup surface I, or is cemented to a cover glass CG which is formed on the image pickup surface I.

Generally, for a variation in the most suitable image plane position which occurs due to the manufacturing error of the objective optical system, the entire objective optical system is to be moved along the optical axis AX at the time of adjusting the image plane position. Accordingly, the most suitable position of the image plane and a position of the image pickup surface are matched. Here, in an objective optical system suitable for a high-definition and small-size image pickup element, a diameter of the smallest circle of confusion is extremely small. Consequently, although the error sensitivity with respect to the position of the objective optical system becomes high, it is preferable to make such arrangement in a case in which this affects an imaging performance and it is necessary to reduce the error sensitivity.

In the second embodiment, it is desirable to satisfy the following conditional expression (11).

$$1.08 < FF/FL < 5 \quad (11)$$

where,

FF is a focal length from the first lens L1 positioned nearest to object up to a lens on the object side of a lens having a positive refractive power which is positioned nearest to image (the cemented lens CL2 in the first embodiment, and the lens L7 in the second embodiment), and FL is the focal length of the objective optical system in the normal observation state.

Conditional expression (11) is related to an appropriate ratio of FF and FL. Moreover, conditional expression (11) is a conditional expression related to the adjustment of the most suitable image plane position.

For adjusting the image pickup surface of the objective optical system, it is preferable to adjust an image position by moving an optical system on the object side of a cemented lens or a positive lens disposed nearest to image in the objective optical system, in an optical axial direction. At this time, it is desirable to satisfy conditional expression (11).

When a value falls below a lower limit value of conditional expression (11), an effect of lowering the sensitivity is weakened, and the significance of imparting an optical refractive power to the lens disposed toward the image pickup surface side is almost ceased, and therefore it is not preferable.

When an upper limit value of conditional expression (11) is exceeded, since the focal length of the lens nearest to image becomes excessively small, although it is possible to lower the error sensitivity, an amount of adjustment at the time of matching the image pickup surface with the most suitable image plane position becomes large, and therefore it is not preferable.

It is more desirable to satisfy the following conditional expression (11') instead of conditional expression (11).

$$1.08 < FF/FL < 1.5 \tag{11'}$$

Within a range of an upper limit value of conditional expression (11'), it is possible to realize the most suitable error sensitivity for adjusting the image pickup surface I. Moreover, when the upper limit value of conditional expression (11') is exceeded, an effect of correcting the spherical aberration which occurs in the lens nearest to image becomes strong. Consequently, the objective optical system may become ideal for an objective optical system for a high-definition image pickup element.

Furthermore, it is more desirable to satisfy the following conditional expression (11") instead of conditional expression (11').

$$1.2 < FF/FL < 1.4 \tag{11''}$$

By satisfying conditional expression (11"), the effect is even stronger than the effect achieved by satisfying conditional expression (11) and conditional expression (11').

Irrespective of an arrangement of refractive power of each lens group, by satisfying conditional expression (11"), it is possible to realize an objective optical system which is strong against the manufacturing error sensitivity, and in which the adjustment of the most suitable image plane position is easy.

For matching the image pickup surface with the most suitable image plane position, a lens interval for adjusting becomes necessary. For this, it is desirable to satisfy the following conditional expression (12) along with conditional expression (11).

$$0.4 < AD/FL < 1.2 \tag{12}$$

where,

AD denotes an air space between an object side surface of a lens having a positive refractive power disposed nearest to image and an image-side surface of a lens immediately before the object, and FL denotes the focal length of the overall objective optical system in the normal observation state.

Conditional expression (12) is related to an appropriate ratio of AD and FL. When a value falls below a lower limit value of conditional expression (12), it is not possible to secure the space necessary for the amount of adjustment for matching the most suitable image plane of the optical system with the position of the image pickup element, and it is not possible to adjust the image pickup surface I with the most suitable image plane, and therefore it is not preferable.

When an upper limit value of conditional expression (12) is exceeded, the air space become larger than necessary and leads to making the overall optical system large-size, and therefore it is not preferable.

Moreover, it is preferable that the objective optical system of the second embodiment satisfies the following conditional expression (13).

$$2 < rf/FL < 8 \tag{13}$$

where, rf denotes a radius of curvature of an object-side surface of a lens having a positive refractive power which is disposed nearest to image, and FL denotes the focal length of the overall objective optical system in the normal observation state.

Conditional expression (13) regulates a conditional for restricting an angle of incidence on the image pickup surface. The image pickup element being small-sized, it is necessary that the angle of incidence of a light ray incident on the image pickup element is within a certain range.

Conditional expression (13) is related to an appropriate ratio of rf and FL. When a value falls below a lower limit value of conditional expression (13), bending of a light ray at the rear most surface (image-side surface) of the rearmost lens disposed nearest to image becomes large, and the optical system becomes a telecentric optical system. However, since a light-ray height becomes high, it leads to making a diameter of the lens large, and therefore it is not preferable. Moreover, an amount of the spherical aberration which occurs at a surface of incidence of the rearmost lens becomes large.

When an upper limit value of conditional expression (13) is exceeded, an angle of oblique incidence on the image pickup surface I becomes large. Consequently, a loss of quantity of light on each pixel of the image pickup element becomes large, and it contributes to light attenuation of a peripheral region, and therefore it is not preferable. Furthermore, when the upper limit value of conditional expression (13) is exceeded, the refractive power of the lens nearest to image becomes weak and therefore the range of conditional expression (11) is also surpassed. Consequently, a problem of the effect of lowering of sensitivity at the time of adjusting the image plane position of the objective optical system becoming small arises.

The expression may be restricted as in the following conditional expression (13') instead of conditional expression (13).

$$2 < rf/FL < 3.5 \tag{13'}$$

In the range of conditional expression (13'), the effect of lowering the sensitivity at the time of adjusting the image plane position of the objective optical system becomes even stronger.

Moreover, it is desirable that the objective optical system according to the first embodiment and the objective optical system according to the second embodiment satisfy the following conditional expression (14).

$$0.10 < df/ff < 0.62 \tag{14}$$

where, df denotes a distance from a front surface (an object-side surface) of a lens having a positive refractive power (or a cemented lens) disposed nearest to image up to a rear surface (an image-side surface) of the lens having a positive refractive power (or a cemented lens) disposed nearest to image, and ff denotes a focal length of the lens having the positive refractive power (or the cemented lens) disposed nearest to image.

Conditional expression (14) is related to an appropriate ratio of df and ff. When a value falls below a lower limit value of conditional expression (14), a magnification ratio of a rearmost positive lens disposed nearest to image becomes small. Consequently, the error sensitivity at the time of adjusting the position of the image plane does not become low. Even when the radius of curvature of the rearmost positive lens is set to be within the range of conditional expression (13), the effect becomes small.

When an upper limit value of conditional expression (14) is exceeded, the error sensitivity at the time of adjusting the position of the image plane becomes low, and a large amount of adjustment has to be made. Consequently, it is necessary to make long a length of a portion fitting a lens barrel which holds the image pickup surface I and the rearmost lens and a lens barrel which holds a lens before the rearmost lens, thereby making the overall lens barrel large in size, and therefore it is not preferable.

It is more desirable to satisfy the following conditional expression (14') instead of conditional expression (14).

$$0.15 < df/ff < 0.40 \quad (14')$$

In the range satisfying conditional expression (14'), the effect becomes even stronger.

Example 1

Figure 2A:
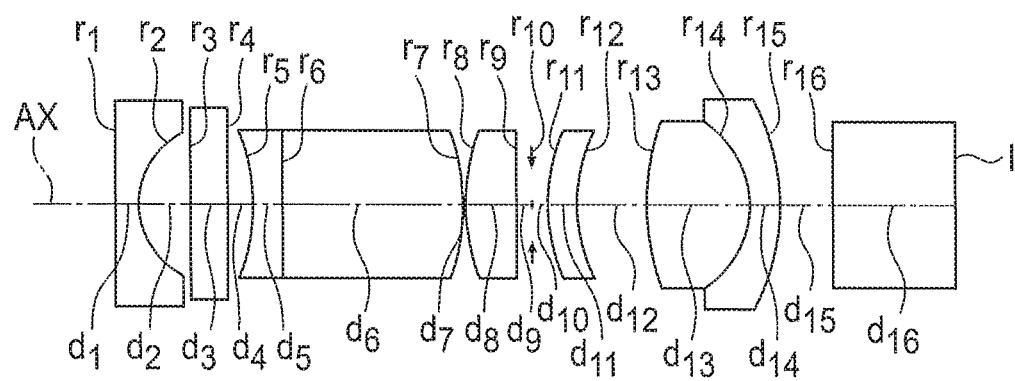
FIG. 2A is a lens cross-sectional view in a normal observation state (an object point at a long distance) of an objective optical system according to an example 1.
Figure 2B:
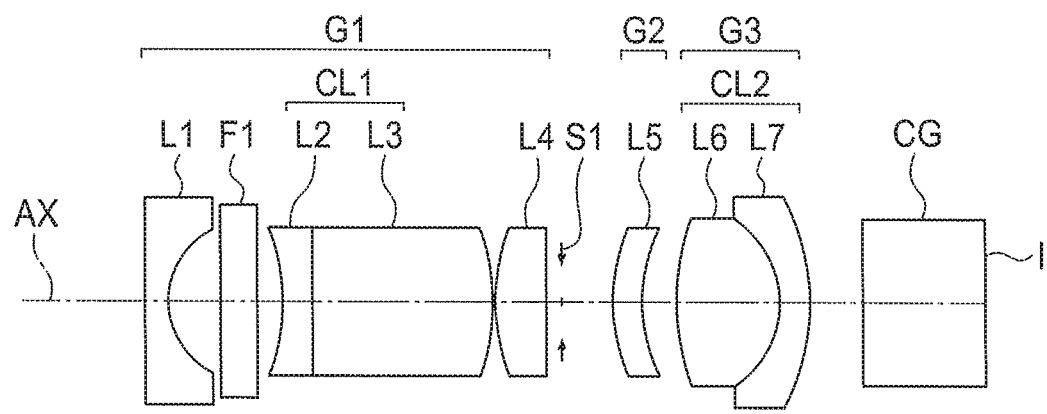
FIG. 2B is a lens cross-sectional view in a close observation state (an object point at a near distance) of the objective optical system according to the example 1.

An objective optical system according an example 1 will be described below. FIG. 2A is a lens cross-sectional view in a normal observation state (an object point at a long distance) of the objective optical system according to the present example, and FIG. 2B is a lens cross-sectional view in a close observation state (an object point at a near distance) of the objective optical system according to the present example.

The objective optical system according to the present example includes in order from an object side, a first group G1 having a positive refractive power, an aperture stop S1, a second group G2 having a negative refractive power, and a third group G3 having a positive refractive power.

The first group G1 having a positive refractive power includes in order from the object side, a first lens L1 which is a planoconcave lens having a negative refractive power of which a concave surface is directed toward an image side, a plane parallel plate F1, a second lens L2 which is a planoconcave lens having a negative refractive power of which a concave surface is directed toward the object side, a third lens L3 which is a planoconvex lens having a positive refractive power of which a convex surface is directed toward the image side, and a fourth lens L4 which is a planoconvex lens having a positive refractive power of which a convex surface is directed toward the object side. The aperture stop S1 is disposed on a rear side (image pickup surface I side) of the first group G1. The second lens L2 having a negative refractive power and the third lens L3 having a positive refractive power are cemented to form a cemented lens CL1.

The second group G2 having a negative refractive power includes a fifth meniscus lens L5 having a negative refractive power of which a convex surface is directed toward the object side. The fifth meniscus lens L5 having a negative refractive power moves toward the image side (image pickup surface I side) along an optical axis AX at the time of focusing from the normal observation state (FIG. 2A) to the close observation state (FIG. 2B).

The third group G3 having a positive refractive power includes in order from the object side, a sixth lens L6 which is a biconvex lens having a positive refractive power and a seventh lens L7 having a negative refractive power of which a convex surface is directed toward the image side. The sixth lens L6 having a positive refractive power and the seventh lens L7 having a negative refractive power are cemented to form a cemented lens CL2.

An image pickup element which is not shown in the diagram is disposed on a rear side (the image pickup surface I side) of the third group G3. A cover glass CG is stuck to a front surface (an object-side surface) of the image pickup element.

The plane parallel plate F1 is a filter having a coating applied thereto to cut specific wavelengths such as, 1060 nm of YAG (yttrium aluminum garnet) laser, 810 nm of semiconductor laser, or an infra-red region.

FIG. 3A, FIG. 3B, FIG. 3C and FIG. 3D show a spherical aberration (SA), an astigmatism (AS), a distortion (DT), and a chromatic aberration of magnification (CC) respectively, in the normal observation state of the present example. FIG. 3E, FIG. 3F, FIG. 3G, and FIG. 3H show a spherical aberration (SA), an astigmatism (AS), a distortion (DT), and a chromatic aberration of magnification (CC) respectively, in the close observation state of the present example.

These aberration diagrams show aberration for each of 656.3 nm (a C-line), 486.1 nm (an F-line), and 546.1 nm (an e-line) wavelengths. Moreover, in the diagrams 'co' denotes a half angle of view. Similar reference numerals are used in the aberration diagrams described below.

Example 2

Figure 4A:
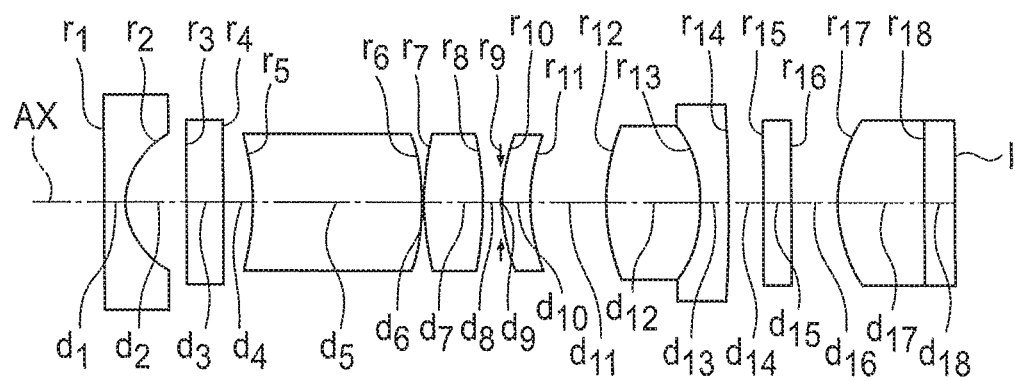
FIG. 4A is a lens cross-sectional view in a normal observation state (an object point at a long distance) of an objective optical system according to an example 2.
Figure 4B:
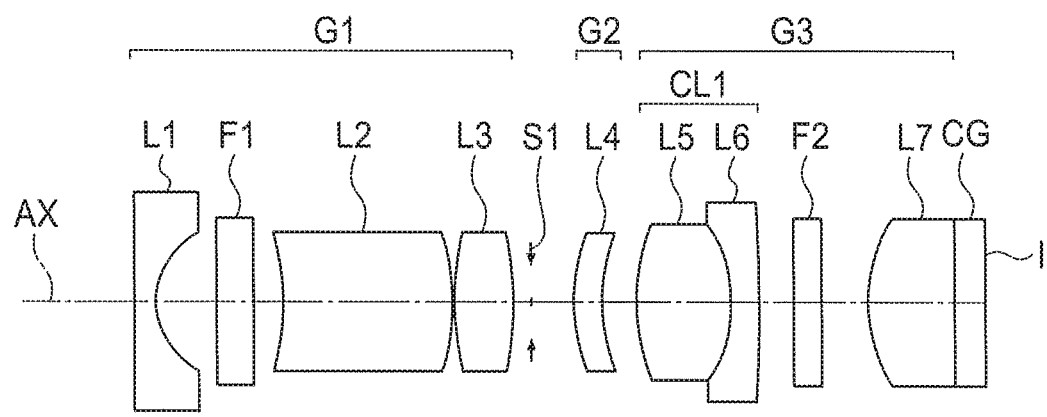
FIG. 4B is a lens cross-sectional view in a close observation state (an object point at a near distance) of the objective optical system according to the example 2.

An objective optical system according to an example 2 will be described below. FIG. 4A is a lens cross-sectional view in a normal observation state (an object point at a long distance) of the objective optical system according to the present example, and FIG. 4B is a lens cross-sectional view in a close observation state (an object point at a near distance) of the objective optical system according to the present example.

The objective optical system according to the present example includes in order from an object side, a first group G1 having a positive refractive power, an aperture stop S1, a second group G2 having a negative refractive power, and a third group G3 having a positive refractive power.

The first group G1 having a positive refractive power includes in order from the object side, a first lens L1 which is a planoconcave lens having a negative refractive power of which a concave surface is directed toward an image side, a plane parallel plate F1, a second meniscus lens L2 having a positive refractive power of which a convex surface is directed toward the image side, and a third lens L3 which is a biconvex lens having a positive refractive power. The aperture stop S1 is disposed on a rear side (image pickup surface I side) of the first group G1.

The second group G2 having a negative refractive power includes a fourth meniscus lens L4 having a negative refractive power of which a convex surface is directed toward the object side. The fourth meniscus lens L4 having a negative refractive power moves toward the image side (image pickup surface I) along an optical axis AX at the time of focusing from the normal observation state (FIG. 4A) to the close observation state (FIG. 4B).

The third group G3 having a positive refractive power includes in order from the object side fifth lens L5 which is a biconvex lens having positive refractive power, a sixth meniscus lens L6 having a negative refractive power of which a convex surface is directed toward the image side, a plane parallel plate F2, and a seventh lens L7 which a planoconvex lens having a positive refractive power of which a convex surface is directed toward the object side. The fifth lens L5 having a positive refractive power and the sixth lens L6 having a negative refractive power L6 are cemented to forma cemented lens CL1.

An image pickup element which is not shown in the diagram is disposed on a rear side (the image pickup surface I side) of the third group G3. A cover glass CG is stuck to a front surface (an object-side surface) of the image pickup element. In the present example, the seventh lens L7 having a positive refractive power is cemented to a front surface of the cover glass CG. The seventh lens L7 having a positive refractive power has a function of a field lens.

The plane parallel plate F1 is a filter having a coating applied thereto to cut specific wavelengths such as, 1060 nm of YAG laser, 810 nm of semiconductor laser, or an infra-red region.

FIG. 5A, FIG. 5B, FIG. 5C, and FIG. 5D show a spherical aberration (SA), an astigmatism (AS), a distortion (DT), and a chromatic aberration of magnification (CC) respectively, in the normal observation state of the present example. FIG. 5E, FIG. 5F, FIG. 5G, and FIG. 5H show a spherical aberration (SA), an astigmatism (AS), a distortion (DT), and a chromatic aberration of magnification (CC) respectively, in the close observation state of the present example.

Example 3

Figure 6A:
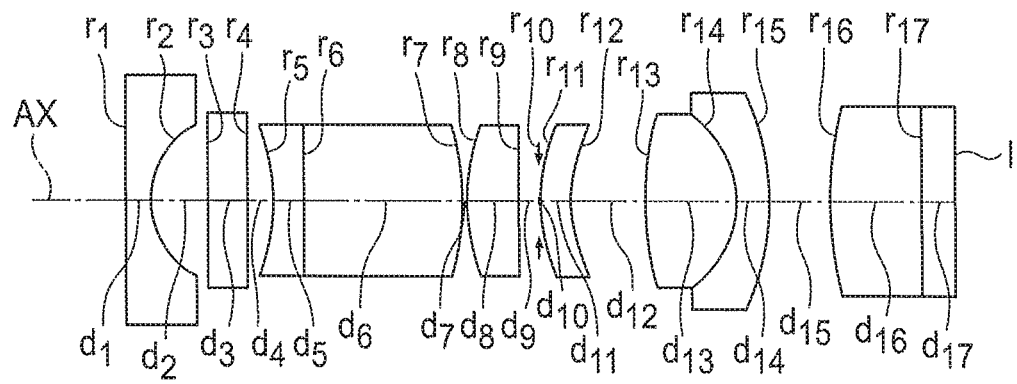
FIG. 6A is a lens cross-sectional view in a normal observation state (an object point at a long distance) of an objective optical system according to an example 3.
Figure 6B:
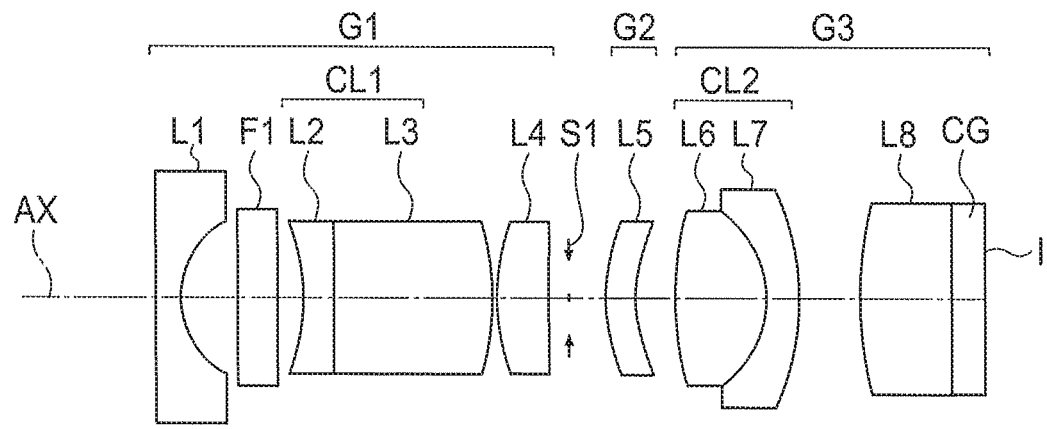
FIG. 6B is a lens cross-sectional view in a close observation state (an object point at a near distance) of the objective optical system according to the example 3.

An objective optical system according to an example 3 will be described below. FIG. 6A is a lens cross-sectional view in a normal observation state (an object point at a long distance) of the objective optical system according to the present example, and FIG. 6B is a lens cross-sectional view in a close observation state (an object point at a near distance) of the objective optical system according to the present example.

The objective optical system according to the present example includes in order from an object side, a first group G1 having a positive refractive power, an aperture stop S1, a second group G2 having a negative refractive power, and a third group G3 having a positive refractive power.

The first group G1 having a positive refractive power includes in order from the object side, a first lens L1 which is a planoconcave lens having a negative refractive power of which a concave surface is directed toward an image side, a plane parallel plate F1, a second lens L2 which is a planoconcave lens having a negative refractive power of which a concave surface is directed toward the object side, a third lens L3 which is a planoconvex lens having a positive refractive power of which a convex surface is directed toward the image side, and a fourth lens L4 which is a planoconvex lens having a positive refractive power of which a convex surface is directed toward the object side. The aperture stop S1 is disposed on a rear side (image pickup surface I side) of the first group G1. The second lens L2 having a negative refractive power and the third lens L3 having a positive refractive power are cemented to form a cemented lens CL1.

The second group G2 having a negative refractive power includes a fifth meniscus lens L5 having a negative refractive power of which a convex surface is directed toward the object side. The fifth meniscus lens L5 having a negative refractive power moves toward the image side (image pickup surface I) along an optical axis AX at the time of focusing from the normal observation state (FIG. 6A) to the close observation state (FIG. 6B).

The third group G3 having a positive refractive power includes a sixth lens L6 which is a biconvex lens having a positive refractive power, a seventh meniscus lens L7 having a negative refractive power of which a convex surface is directed toward the image side, and an eighth lens L8 which is a planoconvex lens having a positive refractive power of which a convex surface is directed toward the object side. The sixth lens L6 having a positive refractive power and the seventh meniscus lens L7 having a negative refractive power are cemented to form a cemented lens CL2.

An image pickup element which is not shown in the diagram is disposed on a rear side (the image pickup surface I side) of the third group G3. A cover glass CG is stuck to a front surface (an object-side surface) of the image pickup element. In the present example, the eighth lens L8 having a positive refractive power is cemented to a front surface of the cover glass CG. The eighth lens L8 having a positive refractive power has a function of a field lens.

The plane parallel plate F1 is a filter having a coating applied thereto to cut specific wavelengths such as, 1060 nm of YAG laser, 810 nm of semiconductor laser, or an infra-red region.

FIG. 7A, FIG. 7B, FIG. 7C, and FIG. 7D show a spherical aberration (SA), an astigmatism (AS), a distortion (DT), and a chromatic aberration of magnification (CC) respectively, in the normal observation state of the present example. FIG. 7E, FIG. 7F, FIG. 7G, and FIG. 7H show a spherical aberration (SA), an astigmatism (AS), a distortion (DT), and a chromatic aberration of magnification (CC) respectively, in the close observation state of the present example.

Example 4

Figure 8A:
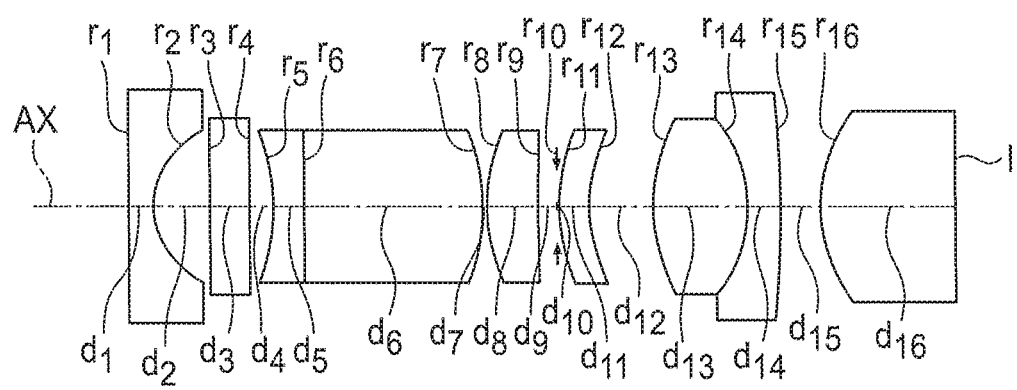
FIG. 8A is a lens cross-sectional view in a normal observation state (an object point at a long distance) of an objective optical system according to an example 4.
Figure 8B:
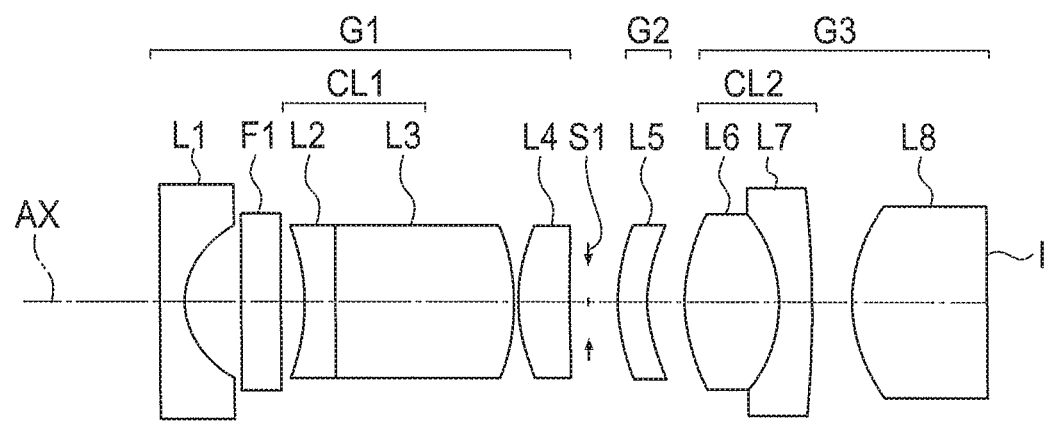
FIG. 8B is a lens cross-sectional view in a close observation state (an object point at a near distance) of the objective optical system according to the example 4.

An objective optical system according to an example 4 will be described below. FIG. 8A is a lens cross-sectional view in a normal observation state (an object point at a long distance) of the objective optical system according to the present example, and FIG. 8B is a lens cross-sectional view in a close observation state (an object point at a near distance) of the objective optical system according to the present example.

The objective optical system according to the present example includes in order from an object side, a first group G1 having a positive refractive power, an aperture stop S1, a second group G2 having a negative refractive power, and a third group G3 having a positive refractive power.

The first group G1 having a positive refractive power includes in order from the object side, a first lens L1 which is a planoconcave lens having a negative refractive power of which a concave surface is directed toward an image side, a second meniscus lens L2 having a negative refractive power of which a convex surface is directed toward the image side, a third meniscus lens L3 having a positive refractive power of which a convex surface is directed toward the image side, and a fourth meniscus lens L4 having a positive refractive power of which a convex surface is directed toward the object. The aperture stop S1 is disposed on a rear side (image pickup surface I side) of the first group G1. The second meniscus lens L2 having a negative refractive power and the third meniscus lens L3 having a positive refractive power are cemented to form a cemented lens CL1.

The second group G2 having a negative refractive power includes a fifth meniscus lens 5 having a negative refractive power of which a convex surface is directed toward the object side. The fifth meniscus lens L5 having a negative refractive power moves toward the image side (image pickup surface I) along an optical axis AX at the time of focusing from the normal observation state (FIG. 8A) to a close observation state (FIG. 8B)

The third group G3 includes a sixth lens L6 which is a biconvex lens having a positive refractive power, a seventh meniscus lens L7 having a negative refractive power of which a convex surface is directed toward the image side, and an eighth lens L8 which is a planoconvex lens having a positive refractive power of which a convex surface is directed toward the object side. The sixth lens L6 having a positive refractive power and the seventh meniscus lens L7 having a negative refractive power are cemented to form a cemented lens CL2.

An image pickup element which is not shown in the diagram is disposed on a rear side (the image pickup surface I side) of the third group G3. A cover glass CG is stuck to a front surface (an object-side surface) of the image pickup element. In the present example, the eighth lens L8 having a positive refractive power is cemented to a front surface of the cover glass CG. The eighth lens L8 having a positive refractive power has a function of a field lens.

The plane parallel plate F1 is a filter having a coating applied thereto to cut specific wavelengths such as, 1060 nm of YAG laser, 810 nm of semiconductor laser, and an infra-red region.

FIG. 9A, FIG. 9B, FIG. 9C, and FIG. 9D show a spherical aberration (SA), an astigmatism (AS), a distortion (DT), and a chromatic aberration of magnification (CC) respectively, in the normal observation state of the present example. FIG. 9E, FIG. 9F, FIG. 9G, and FIG. 9H show a spherical aberration (SA), an astigmatism (AS), a distortion (DT), and a chromatic aberration of magnification (CC) respectively, in the close observation state of the present example.

Example 5

Figure 10A:
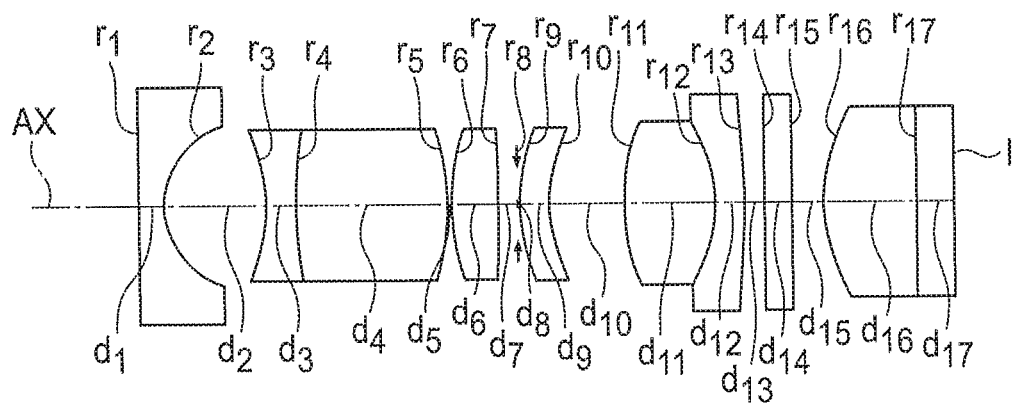
FIG. 10A is a lens cross-sectional view in a normal observation state (an object point at a long distance) of an objective optical system according to an example 5.
Figure 10B:
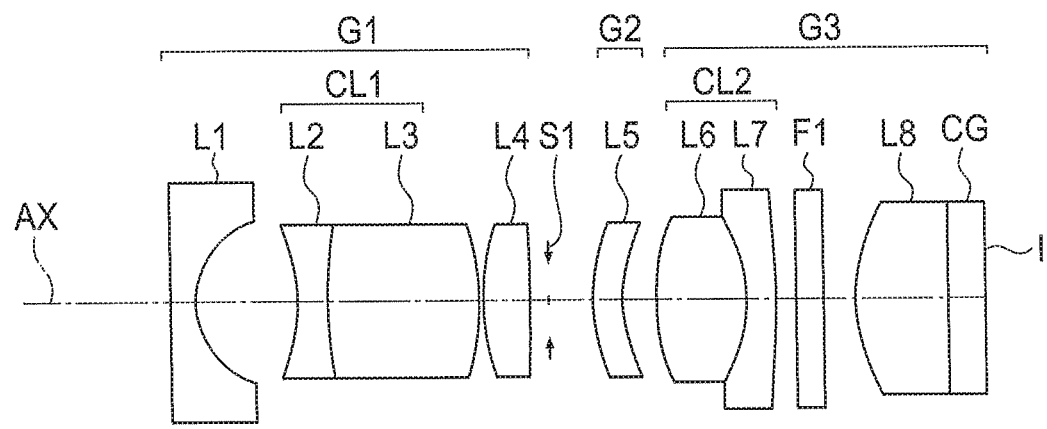
FIG. 10B is a lens cross-sectional view in a close observation state (an object point at a near distance) of the objective optical system according to the example 5.

An objective optical system according to an example 5 will be described below. FIG. 10A is a lens cross-sectional view in a normal observation state (an object point at a long distance) of the objective optical system according to the present example, and FIG. 10B is a lens cross-sectional view in a close observation state (an object point at a near distance) of the objective optical system according to the present example.

The objective optical system according to the present example includes in order from an object side, a first group G1 having a positive refractive power, an aperture stop S, a second group G2 having a negative refractive power, and a third group G3 having a positive refractive power.

The first group G1 having a positive refractive power includes in order from the object side, a first lens L1 which is a planoconcave lens having a negative refractive power of which a concave surface is directed toward an image side, a second lens L2 which is a biconcave lens having a negative refractive power, a third lens L3 which is a biconvex lens having a positive refractive power, and a fourth lens L4 which is a biconvex lens having a positive refractive power.

The aperture stop S1 is disposed on a rear side (image pickup surface I side) of the first group G1. The second lens L2 having a negative refractive power and the third lens L3 having a positive refractive are cemented to form a cemented lens CL1.

The second group G2 having a negative refractive power includes a fifth meniscus lens L5 having a negative refractive power of which a convex surface is directed toward the object side. The fifth meniscus lens L5 having a negative refractive power moves toward the image side (image pickup surface I) along an optical axis AX at the time of focusing from the normal observation state (FIG. 10A) to the close observation state (FIG. 10B).

The third group G3 includes a sixth lens L6 which is a biconvex lens having a positive refractive power, a seventh meniscus lens L7 having a negative refractive power of which a convex surface is directed toward the image side, a plane parallel plate F1, and an eighth lens L8 which is a planoconvex lens having a positive refractive power of which a convex surface is directed toward the object side. The sixth lens L6 having a positive refractive power and the seventh lens L7 having a negative refractive power are cemented to form a cemented lens CL2.

An image pickup element which is not shown in the diagram is disposed on a rear side (the image pickup surface I side) of the third group G3. A cover glass CG is stuck to a front surface (an object-side surface) of the image pickup element. In the present example, the eighth lens L8 having a positive refractive power is cemented to a front surface of the cover glass CG. The eighth lens L8 having a positive refractive power has a function of a field lens.

The plane parallel plate F1 is a filter having a coating applied thereto to cut specific wavelengths such as, 1060 nm of YAG laser, 810 nm of semiconductor laser, and an infra-red region.

FIG. 11A, FIG. 11B, FIG. 11C, and FIG. 11D show a spherical aberration (SA), an astigmatism (AS), a distortion (DT), and a chromatic aberration of magnification (CC) respectively, in the normal observation state of the present example. FIG. 11E, FIG. 11F, FIG. 11G, and FIG. 11H show a spherical aberration (SA), an astigmatism (AS), a distortion (DT), and a chromatic aberration of magnification (CC) respectively, in the close observation state of the present example.

Numerical data for each example is shown below. Regarding the symbols, r denotes a radius of curvature of each lens surface, d denotes a distance between lens surfaces, ne denotes a refractive index for an e-line of each lens, vd denotes Abbe's number for each lens, Fno denotes an F-number, ω denotes the half angle of view, IH denotes an image height, and a stop denotes an aperture stop.

Example 1

| Unit mm | | | | |
|---|---|---|---|---|
| Surface data | | | | |
| Surface no. | r | d | ne | vd |
| 1 | ∞ | 0.380 | 1.88815 | 40.76 |
| 2 | 1.415 | 0.869 | | |
| 3 | ∞ | 0.620 | 1.52300 | 65.13 |
| 4 | ∞ | 0.380 | | |
| 5 | −3.397 | 0.484 | 1.51825 | 64.14 |
| 6 | ∞ | 2.893 | 1.88815 | 40.76 |

-continued

Unit mm

| | | | | |
|---|---|---|---|---|
| 7 | -4.011 | 0.050 | | |
| 8 | 3.732 | 0.795 | 1.48915 | 70.23 |
| 9 | ∞ | 0.250 | | |
| 10 (Stop) | ∞ | Variable | | |
| 11 | 3.310 | 0.468 | 1.80642 | 34.97 |
| 12 | 2.418 | Variable | | |
| 13 | 4.145 | 1.622 | 1.77621 | 49.60 |
| 14 | -1.677 | 0.500 | 1.93429 | 18.90 |
| 15 | -4.343 | 0.842 | | |
| 16 | ∞ | 2.000 | 1.51825 | 64.14 |
| 17 (Imaging pickup surface) | ∞ | | | |

Various data

| | Normal observation state | Close observation state |
|---|---|---|
| f | 1.044 | 1.063 |
| Fno | 2.99 | 3.07 |
| Object distance | 26.5 | 8.95 |
| ω | 68.4 | 64.0 |
| d10 | 0.280 | 0.855 |
| d12 | 1.131 | 0.556 |
| IH | 1.0 | |

Example 2

Unit mm

Surface data

| Surface no. | r | d | ne | νd |
|---|---|---|---|---|
| 1 | ∞ | 0.390 | 1.88815 | 40.76 |
| 2 | 1.373 | 1.087 | | |
| 3 | ∞ | 0.624 | 1.49557 | 75.00 |
| 4 | ∞ | 0.460 | | |
| 5 | -4.977 | 2.941 | 1.93429 | 18.90 |
| 6 | -5.193 | 0.051 | | |
| 7 | 6.099 | 1.044 | 1.48915 | 70.23 |
| 8 | -5.065 | 0.300 | | |
| 9 (Stop) | ∞ | Variable | | |
| 10 | 3.819 | 0.468 | 1.73429 | 28.46 |
| 11 | 2.708 | Variable | | |
| 12 | 3.530 | 1.643 | 1.73234 | 54.68 |
| 13 | -2.928 | 0.500 | 1.93429 | 18.90 |
| 14 | -22.619 | 0.600 | | |
| 15 | ∞ | 0.500 | 1.51825 | 64.14 |
| 16 | ∞ | 0.780 | | |
| 17 | 2.808 | 1.500 | 1.51825 | 64.14 |
| 18 | ∞ | 0.550 | 1.56606 | 60.67 |
| 19 (Imaging pickup surface) | ∞ | | | |

Various data

| | Normal observation state | Close observation state |
|---|---|---|
| f | 1.039 | 1.079 |
| Fno | 2.99 | 3.11 |
| Object distance | 27.3 | 8.97 |
| ω | 71.8 | 65.2 |
| d9 | 0.033 | 0.766 |
| d11 | 1.300 | 0.567 |
| IH | 1.0 | |

Example 3

Unit mm

Surface data

| Surface no. | r | d | ne | νd |
|---|---|---|---|---|
| 1 | ∞ | 0.374 | 1.88815 | 40.76 |
| 2 | 1.415 | 0.872 | | |
| 3 | ∞ | 0.624 | 1.49557 | 75.00 |
| 4 | ∞ | 0.418 | | |
| 5 | -3.206 | 0.484 | 1.51825 | 64.14 |
| 6 | ∞ | 2.462 | 1.88815 | 40.76 |
| 7 | -3.748 | 0.052 | | |
| 8 | 3.608 | 0.796 | 1.48915 | 70.23 |
| 9 | ∞ | 0.296 | | |
| 10 (Stop) | ∞ | Variable | | |
| 11 | 3.292 | 0.468 | 1.80642 | 34.97 |
| 12 | 2.384 | Variable | | |
| 13 | 4.293 | 1.420 | 1.77621 | 49.60 |
| 14 | -1.744 | 0.499 | 1.93429 | 18.90 |
| 15 | -4.691 | 0.936 | | |
| 16 | 8.017 | 1.400 | 1.51825 | 64.14 |
| 17 | ∞ | 0.560 | 1.51825 | 64.14 |
| 18 (Imaging pickup surface) | ∞ | | | |

Various data

| | Normal observation state | Close observation state |
|---|---|---|
| f | 1.014 | 1.038 |
| Fno | 2.95 | 3.04 |
| Object distance | 27.3 | 8.95 |
| ω | 72.5 | 66.8 |
| d10 | 0.033 | 0.614 |
| d12 | 1.158 | 0.577 |
| IH | 1.0 | |

Example 4

Unit mm

Surface data

| Surface no. | r | d | ne | νd |
|---|---|---|---|---|
| 1 | ∞ | 0.395 | 1.88815 | 40.76 |
| 2 | 1.408 | 0.850 | | |
| 3 | ∞ | 0.635 | 1.49557 | 75.00 |
| 4 | ∞ | 0.300 | | |
| 5 | -4.017 | 0.492 | 1.51825 | 64.14 |
| 6 | -21.659 | 2.784 | 1.88815 | 40.76 |
| 7 | -3.554 | 0.052 | | |
| 8 | 2.623 | 0.779 | 1.48915 | 70.23 |
| 9 | 6.603 | 0.299 | | |
| 10 (Stop) | ∞ | Variable | | |
| 11 | 3.030 | 0.475 | 1.85504 | 23.78 |
| 12 | 2.132 | Variable | | |
| 13 | 3.312 | 1.448 | 1.77621 | 49.60 |
| 14 | -2.363 | 0.501 | 1.93429 | 18.90 |
| 15 | -18.495 | 0.638 | | |
| 16 | 2.855 | 2.080 | 1.51825 | 64.14 |
| 17 (Imaging pickup surface) | ∞ | | | |

Various data

| | Normal observation state | Close observation state |
|---|---|---|
| f | 1.000 | 1.025 |
| Fno | 3.81 | 3.94 |
| Object distance | 27.5 | 9.1 |
| ω | 67.3 | 62.7 |
| d10 | 0.034 | 0.497 |

-continued

Unit mm

| | | |
|---|---|---|
| d12 | 1.012 | 0.560 |
| IH | 0.944 | |

Example 5

Unit mm

Surface data

| Surface no. | r | d | ne | vd |
|---|---|---|---|---|
| 1 | ∞ | 0.378 | 1.88815 | 40.76 |
| 2 | 1.373 | 1.583 | | |
| 3 | −2.673 | 0.463 | 1.51825 | 64.14 |
| 4 | 9.531 | 2.338 | 1.88815 | 40.76 |
| 5 | −4.189 | 0.050 | | |
| 6 | 4.059 | 0.745 | 1.48915 | 70.23 |
| 7 | −11.662 | 0.285 | | |
| 8 (Stop) | ∞ | Variable | | |
| 9 | 3.272 | 0.442 | 1.80642 | 34.97 |
| 10 | 2.339 | Variable | | |
| 11 | 3.579 | 1.382 | 1.77621 | 49.60 |
| 12 | −2.919 | 0.488 | 1.97189 | 17.47 |
| 13 | −13.679 | 0.320 | | |
| 14 | ∞ | 0.400 | 1.51500 | 75.00 |
| 15 | ∞ | 0.500 | | |
| 16 | 2.725 | 1.430 | 1.51825 | 64.14 |
| 17 | ∞ | 0.580 | 1.51825 | 64.14 |
| 18 (Imaging pickup surface) | ∞ | | | |

Various data

| | Normal observation state | Close observation state |
|---|---|---|
| f | 0.999 | 1.034 |
| Fno | 3.04 | 3.15 |
| Object distance | 26.5 | 8.7 |
| ω | 73.4 | 66.2 |
| d8 | 0.032 | 0.658 |
| d10 | 1.162 | 0.536 |
| IH | 0.970 | |

Values of the conditional expressions in each example are shown below.

| Conditional expression | Example 1 | Example 2 | Example 3 |
|---|---|---|---|
| (1) G2f/FL | −13.922 | −14.855 | −13.729 |
| (2) G3f/G1f | 1.398 | 1.222 | 1.282 |
| (3) H1/FL | 1.336 | 1.381 | 1.417 |
| (4) f1/FL | −1.527 | −1.488 | −1.571 |
| (5) d2G/FL | 0.551 | 0.705 | 0.573 |
| (6) G2f/G1f | −5.715 | −5.029 | −5.454 |
| (7) G2f/G3f | −4.088 | −4.115 | −4.255 |
| (8) r2/FL | 1.356 | 1.320 | 1.395 |
| (9) G2fr/G2rr | 1.369 | 1.410 | 1.381 |
| (10) C1F/C1R | −1.451 | — | −1.466 |
| (11) FF/FL | 4.89 | 1.32 | 1.09 |
| (12) AD/FL | 1.08 | 0.75 | 0.92 |
| (13) rf/FL | 3.97 | 2.70 | 7.91 |
| (14) df/ff | 0.597 | 0.376 | 0.127 |

| Conditional expression | Example 4 | Example 5 |
|---|---|---|
| (1) G2f/FL | −11.127 | −12.915 |
| (2) G3f/G1f | 1.267 | 1.130 |
| (3) H1/FL | 1.391 | 1.398 |
| (4) f1/FL | −1.585 | −1.548 |
| (5) d2G/FL | 0.463 | 0.627 |
| (6) G2f/G1f | −4.679 | −4.708 |
| (7) G2f/G3f | −3.691 | −4.168 |
| (8) r2/FL | 1.408 | 1.375 |
| (9) G2fr/G2rr | 1.421 | 1.399 |
| (10) C1F/C1R | −2.152 | −1.116 |
| (11) FF/FL | 1.32 | 1.32 |
| (12) AD/FL | 0.64 | 0.50 |
| (13) rf/FL | 2.86 | 2.73 |
| (14) df/ff | 0.378 | 0.382 |

The abovementioned objective optical systems may satisfy a plurality of arrangements simultaneously. Making such arrangement is preferable for achieving a favorable objective optical system. Moreover, combinations of favorable arrangements are arbitrary. Furthermore, for each conditional expression, only an upper limit value or a lower limit value of a further restricted numerical range of conditional expression may be restricted.

Various embodiments of the present invention have been described heretofore. However, the present invention is not restricted to the embodiments described heretofore, and embodiments in which arrangements of the abovementioned embodiments are combined appropriately without departing from the scope of the invention also fall in the category of the present invention.

(Note)

An invention with the following arrangement is derived from the examples described above.

(Appended Mode 1)

An objective optical system comprises in order from an object side:

a first group having a positive refractive power;

a second group having a negative refractive power; and a third group having a positive refractive power, wherein focusing is carried out by moving the second group, and the objective optical system satisfies the following conditional expression (1)

$$-18 < G2f/FL < -11 \quad (1)$$

where,

G2f denotes a focal length of the second group G2, and

FL denotes a focal length of the overall objective optical system in a normal observation state.

(Appended Mode 2)

The objective optical system according to appended mode 1, wherein the objective optical system satisfies any of the following conditional expressions (2), (3), (4), (5), (6), (7), (8), (9), (10), (11), (12), (13), and (14)

$$0.75 < G3f/G1f < 1.47 \quad (2)$$

$$1.23 < H1/FL < 1.45 \quad (3)$$

$$-1.7 < f1/FL < -1.4 \quad (4)$$

$$0.35 < d2G/FL < 0.75 \quad (5)$$

$$-8 < G2f/G1f < -2 \quad (6)$$

$$-7 < G2f/G3f < -1.8 \quad (7)$$

$$1.1 < r2/FL < 1.45 \quad (8)$$

$$1.3 < G2fr/G2rr < 1.8 \quad (9)$$

$$-3.0 < C1F/C1R < -1.0 \quad (10)$$

$$1.08 < FF/FL < 5 \quad (11)$$

$$0.4 < AD/FL < 1.2 \tag{12}$$

$$2 < rf/FL < 8 \tag{13}$$

$$0.10 < df/ff < 0.62 \tag{14}$$

where,

G3f denotes a focal length of the third group,

G1f denotes a focal length of the first group,

H1 denotes the maximum height of a principal light ray at an object-side surface of the first lens L1, and FL denotes a focal length of the overall objective optical system in the normal observation state, f1 denotes a focal length of the first lens L1, d2G denotes an amount of movement of the second group G2, G2f denotes a focal length of the second group G2, r2 denotes a radius of curvature of an image-side surface of the first lens L1, G2fr denotes a radius of curvature of an object-side surface of a lens in the second group G2, G2rr denotes a radius of curvature of an image-side surface of a lens in the second group G2, C1F denotes a focal length of the second lens L2 having a negative refractive power in the cemented lens CL1 in the first group G1, C1R denotes a focal length of the third lens L3 having a positive refractive power in the cemented lens CL1 in the first group G1, FF is a focal length from the first lens L1 positioned nearest to object up to a lens on the object side of a lens having a positive refractive power which is positioned nearest to image, AD denotes an air space between an object-side surface of a lens having a positive refractive power disposed nearest to image and an image-side surface of a lens immediately before the object, rf denotes a radius of curvature of an object-side surface of a lens having a positive refractive power which is disposed nearest to image, df denotes a distance from a front surface (an object-side surface) of a lens having a positive refractive power (or a cemented lens) disposed nearest to image up to a rear surface (an image-side surface) of the lens having a positive refractive power (or a cemented lens) disposed nearest to image, and ff denotes a focal length of the lens having the positive refractive power (or the cemented lens) disposed nearest to image.

(Appended Mode 3)

The objective optical system according to one of appended mode 1 and appended mode 2, wherein the first group includes in order from the object side, a first lens having a negative refractive power, a cemented lens in which a second lens having a negative refractive power of which a concave surface is directed toward the object side and a third lens having a positive refractive power of which a convex surface is directed toward an image side are cemented, and a fourth lens having a positive refractive power.

(Appended Mode 4)

The objective optical system according to any one of appended mode 1, appended mode 2, and appended mode 3, wherein a lens disposed nearest to image in the objective optical system is a planoconvex lens having a positive refractive power of which a convex surface is directed toward the object side, and has one of an arrangement of being stuck directly to an image pickup surface and an arrangement of being cemented to a cover glass which is formed on the image pickup surface.

The present invention is useful for an objective optical system which is suitable for an objective optical system having a focusing function, and particularly to an endoscope objective lens which enables a close observation, and other taking lenses suitable for small household cameras.

An embodiment of the present invention shows an effect that it is possible to provide a bright objective optical system with an improved performance, which is suitable for a small-size image pickup element with a large number of pixels, and which enables focusing according to a variation in an object point distance.

What is claimed is:

1. An objective optical system consisting of, in order from an object side to an image side:

a first group having a positive refractive power;

an aperture stop;

a second group having a negative refractive power; and a third group having a positive refractive power, wherein:

the first group consists of, in order from the object side to the image side, (i) a first lens having a negative refractive power, a concave surface of the first lens being directed toward the image side, (ii) a cemented lens in which a second lens having a negative refractive power and a third lens having a positive refractive power are cemented, and (iii) a fourth lens having a positive refractive power, focusing is carried out by moving the second group, and the objective optical system satisfies the following conditional expressions (1') and (10):

$$-16.6 < G2f/FL < -11 \tag{1'}$$

$$-3.0 < C1F/C1R < -1.0 \tag{10}$$

where,

G2f denotes a focal length of the second group,

FL denotes a focal length of the overall objective optical system in a normal observation state, C1F denotes a focal length of the second lens, and C1R denotes a focal length of the third lens.

2. The objective optical system according to claim 1, wherein the objective optical system satisfies the following conditional expression (2)

$$0.75 < G3f/G1f < 1.47 \tag{2}$$

where,

G3f denotes a focal length of the third group, and

G1f denotes a focal length of the first group.

* * * * *